United States Patent [19]

Healy

[11] 3,981,361
[45] Sept. 21, 1976

[54] OIL RECOVERY METHOD USING MICROEMULSIONS

[75] Inventor: Robert N. Healy, Houston, Tex.

[73] Assignee: Exxon Production Research Company, Houston, Tex.

[22] Filed: July 31, 1975

[21] Appl. No.: 601,126

[52] U.S. Cl. .............................. 166/252; 166/274; 166/275; 252/8.55 D
[51] Int. Cl.² .......................................... E21B 43/22
[58] Field of Search ........... 166/252, 273, 274, 275, 166/305 R; 252/8.55 D

[56] References Cited
UNITED STATES PATENTS

| | | | |
|---|---|---|---|
| 3,467,190 | 9/1969 | Dunlap et al. | 166/252 |
| 3,561,530 | 2/1971 | Tosch et al. | 166/252 |
| 3,623,553 | 11/1971 | Burdge | 166/275 |
| 3,753,465 | 8/1973 | Denekas | 166/252 |
| 3,885,628 | 5/1975 | Reed et al. | 166/252 |
| 3,888,308 | 6/1975 | Gale et al. | 166/273 |
| 3,901,317 | 8/1975 | Plummer et al. | 166/274 |
| R27,387 | 6/1972 | Davis, Jr. et al. | 166/252 |
| R27,456 | 8/1972 | Davis, Jr. et al. | 166/252 |

*Primary Examiner*—Stephen J. Novosad
*Assistant Examiner*—George A. Suckfield
*Attorney, Agent, or Firm*—Gary D. Lawson

[57] ABSTRACT

Disclosed herein is a method for recovering oil from subterranean formations using microemulsions. The microemulsion is compounded from an oil, an aqueous medium, and a surfactant, and its parameters are varied to form volumetric ratios of oil to surfactant in the microemulsion and/or water to surfactant in the microemulsion greater than 0.5. Preferably, the volumetric ratios will be greater than 2.0. Among the parameters which can be adjusted to change these volumetric ratios include the salinity of the aqueous medium, the temperature of the microemulsion system, the chemical structure of the surfactant, the chemical structure of any cosurfactant included in the microemulsion, the degree of aromaticity of the oil, and composition of dissolved solids in the aqueous medium. In one preferred embodiment of the invention an oil is chosen which has physical and chemical characteristics substantially the same as the formation oil. The aqueous medium has physical and chemical characteristics substantially the same as the formation water. A surfactant which has a chemical structure which will form a microemulsion having volumetric ratios of oil to surfactant and/or of water to surfactant greater than 0.5 is selected for inclusion in the microemulsion system. The oil; aqueous medium; and surfactant, determined in accordance with the teachings of this invention, form a class of microemulsions which is effective in recovering oil from subterranean formations of interest. All microemulsions within the class will be effective for recovering oil from the formation. Oil is recovered by compounding a microemulsion within the class and injecting this microemulsion into the formation.

19 Claims, 4 Drawing Figures

OIL RECOVERY METHOD USING MICROEMULSIONS

BACKGROUND OF THE INVENTION

1. Field of the Invention

This invention relates to a process for recovering oil from a subterranean formation by placing fluid into the formation by means of a well. More specifically, this invention relates to a method of designing a microemulsion for recovering oil from an oil-bearing subterranean formation.

2. Description of the Prior Art

The petroleum industry has recognized for many years that only a small fraction of the original oil in place in a reservoir is expelled by natural mechanisms. It is also well-known that conventional methods of supplementing natural recovery are relatively inefficient. Typically, a reservoir may retain half its original oil even after the application of currently available methods of secondary recovery. Accordingly, there is a continuing need for improved recovery methods which will substantially increase the ultimate yield of petroleum for subterranean reservoirs.

Waterflooding is by far the most widely practiced method for recovering oil from a formation after naturally occurring forces in the formation have declined in their ability to expel oil. In waterflooding, water is injected through an input well to drive oil to offset producing wells. Much of the current work in oil recovery technology has been directed toward improving the efficiency of waterflooding processes or developing alternative processes.

Surface-active agents or surfactants are one class of materials which have been proposed for improving the efficiency of waterflooding processes. Much of the oil that is retained in the reservoir after a typical waterflood is in the form of discontinuous globules or discrete droplets which are trapped within the pore spaces of the reservoir. It has been suggested that, because the normal interfacial tension between the reservoir oil and water is so high, these discrete droplets are unable to sufficiently deform to pass through narrow constrictions in the pore channels. When surface-active agents are added to the flood water, they lower the interfacial tension between the water and the reservoir oil and permit the oil droplets to deform and flow with the flood water. It is generally conceded that the interfacial tension between the flood water and the reservoir oil must be reduced to less than 0.1 dyne/cm for effective recovery.

Where conventional surfactant waterflooding may be effective in obtaining additional oil from subterranean oil reservoirs, it has a number of shortcomings which detract seriously from its value. One difficulty which has been observed in the use of surfactants in general is the tendency of the surfactants to be depleted from the injected solution. It has been postulated that at least a part of the surface-active agents may be adsorbed on the rock surface of the reservoir or physically entrapped within the pore spaces of the rock matrix. It is also known that many surfactants react with ionic substances in the water within the formation and are precipitated and therefore unable to interact at the oil/water interface to reduce the interfacial tension. As a result the oil recovery efficiency can be reduced due to surfactant depletion.

One method for reducing surfactant depletion and increasing oil recovery is the use of microemulsions. Microemulsions are well-known (see for example, U.S. Pat. No. 3,254,714, Gogarty et al., issued June 1966) and are mixtures of a liquid hydrocarbon, water, and a surfactant. Optionally, a cosurfactant, such as an alcohol, and electrolytes may be present in the mixture. The microemulsion is a stable, transparent or translucent mixture of these compounds and is injected into the formation and displaced through the formation by means of a driving fluid such as thickened water. These microemulsions have been characterized as oil-external or water-external and generally are considered miscible with the crude oil in the formation and the water which displaces it, at least when initially injected.

More recent activities have suggested the use of microemulsion systems which are immiscible with the formation crude oil and/or formation water upon injection but which exhibit extremely low interfacial tensions with the crude oil and formation water (see for example, U.S. Pat. No. 3,885,628, Reed et al., issued May 27, 1975). While microemulsion flooding appears to have promise in recovering oil, a need exists for techniques to more precisely define the characteristics of the microemulsions and to more accurately design a microemulsion system for application under actual reservoir conditions.

SUMMARY OF THE INVENTION

The foregoing deficiencies and disadvantages of conventional microemulsion systems can be eliminated in accordance with the teachings of this application. In this invention oil is recovered from subterranean formations using microemulsions having specifically designed characteristics. These specifically designed characteristics for the microemulsion systems are determined from their solubilization properties, i.e., the solubilization of oil in the microemulsion with respect to surfactant and the solubilization of water in the microemulsion with respect to surfactant. These solubilization characteristics are conveniently determined from the volumetric ratios of water to surfactant and oil to surfactant in the microemulsion system.

In a specific embodiment of this invention an oil having physical and chemical characteristics similar to those of the formation oil, an aqueous medium having physical and chemical characteristics similar to those of the formation water, and a selected surfactant are combined. The surfactant is employed in an amount in excess of the critical micelle concentration for the system in order to form a microemulsion. The surfactant is selected for its ability to form a volumetric ratio of water to surfactant in the microemulsion greater than 0.5 and/or a volumetric ratio of oil to surfactant in the microemulsion greater than 0.5. Preferably, these volumetric ratios will exceed 2.0. Microemulsions compounded from such an oil, such an aqueous medium, and such a surfactant will form a class of microemulsions all of which are effective in recovering oil from the subterranean formation of interest.

The volumetric ratios determined in accordance with the practice of this invention can be directly correlated to the interfacial tensions of the microemulsion system. The volumetric ratio of oil to surfactant is inversely related to the interfacial tension between the microemulsion and oil. Similarly, the volumetric ratio of water to surfactant is inversely related to the interfacial tension between the microemulsion and water. Thus, the volumetric ratios determined in accordance with the practice of this invention provide a ready estimation of interfacial tension.

The objects and advantages of this invention perhaps can be seen most easily by reference to the following drawings and description of the invention.

DESCRIPTION OF THE INVENTION

Figure 1:
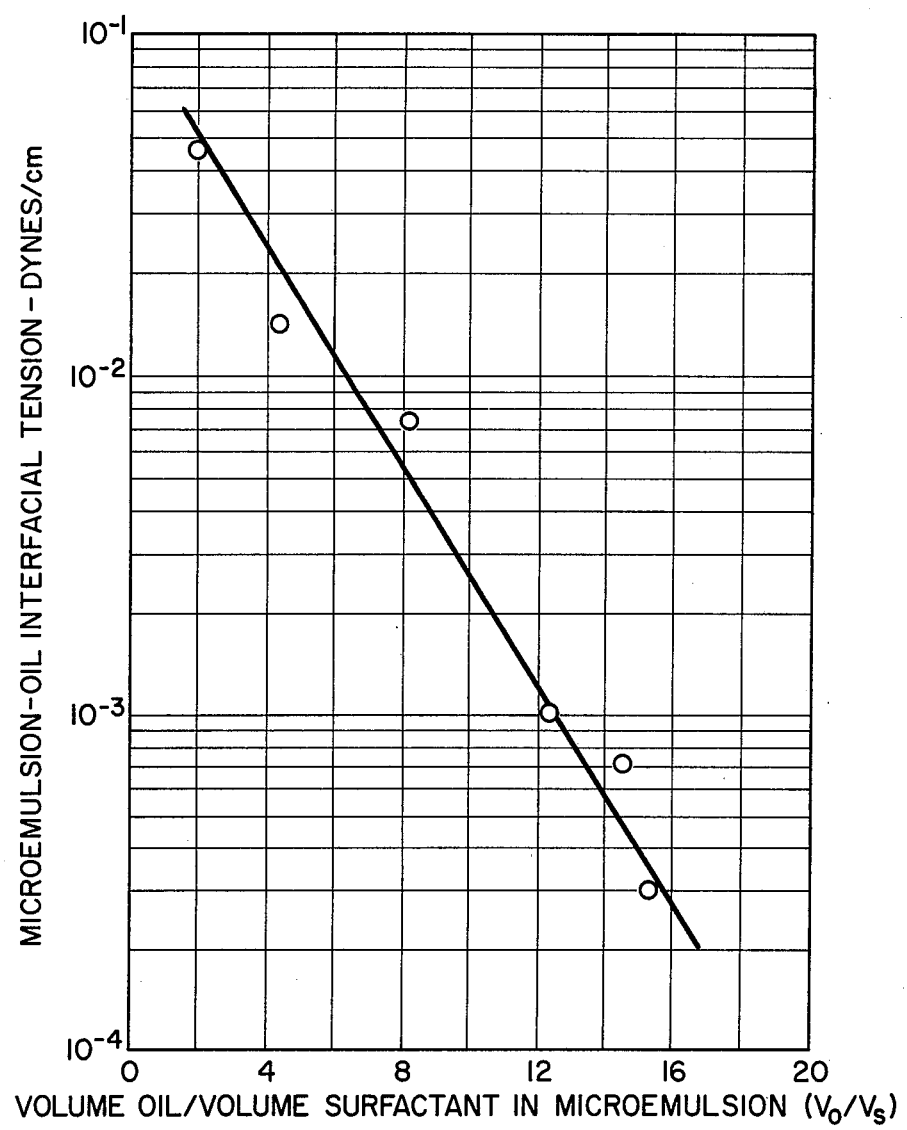
FIG. 1 is a semilogarithmic graph of interfacial tension expressed in dyne/cm between a microemulsion and an oil which is immiscible and in equilibrium with the microemulsion as a function of the volumetric ratio of oil to surfactant in the microemulsion.

In the practice of this invention, microemulsions are designed with specific characteristics for the most effective recovery of oil from subterranean oil-bearing formations. It has been found that such specifically designed microemulsions can be made by determining and adjusting their solubilization characteristics, i.e., the solubilization of oil in the microemulsion with respect to surfactant and the solubilization of water in the microemulsion with respect to surfactant. These solubilization characteristics are perhaps most easily characterized as volumetric ratios, i.e., the ratio of the volume of oil contained in the microemulsion to the volume of surfactant in the microemulsion ($V_o/V_s$) and the ratio of water contained in the microemulsion to the volume of surfactant in the microemulsion ($V_w/V_s$).

An effective microemulsion for an oil recovery process must efficiently displace oil, and in turn the microemulsion must be effectively displaced by any water which drives it through the formation. To satisfy these criteria both the microemulsion-oil and microemulsion-water interfacial tensions must be low.

Solubilization characteristics are determined for microemulsions that are immiscible with water, or oil, or both water and oil. Microemulsions which are immiscible with oil exhibit a zero interfacial tension against water, and the microemulsion-oil interfacial tension is sufficiently low for effective oil recovery provided $V_o/V_s$ is greater than 0.5 and preferably greater than 2.0. Microemulsions which are immiscible with water exhibit a zero interfacial tension against oil, and the microemulsion-water interfacial tension is sufficiently low provided $V_w/V_s$ is greater than 0.5 and preferably greater than 2.0. Microemulsions which are immiscible with both water and oil have sufficiently low microemulsion-oil and microemulsion-water interfacial tensions for effective oil recovery when $V_o/V_s$ and $V_w/V_s$ are both greater than 0.5 and preferably greater than 2.0. When these volumetric ratios are substantially equal the microemulsions which are immiscible with both oil and water will be particularly effective for oil recovery.

As will be shown later, the volumetric ratios are related to the interfacial tensions between the microemulsion and oil and between the microemulsion and water. Therefore, in another aspect of this invention a microemulsion having equal interfacial tensions between formation oil and formation water can be employed to recover oil from the formation.

Another important recognition is the fact that the volumetric ratios can be used to define a class or system of microemulsions which will be most effective in recovering oil under specified conditions. When it is determined that a particular oil, aqueous medium and surfactant give satisfactory volumetric ratios, other microemulsions containing the same components, albeit in other proportions, will also be highly effective in recovering oil under the specified conditions. Thus, these volumetric ratios can be used to define a class of microemulsions, and a member of this class (for example, a microemulsion having a low oil content) can be used to recover oil from the formation of interest. This will permit efficient oil recovery by using a member of the designed class and under economical conditions since the microemulsion contains less oil.

The expression "microemulsion" as used herein is defined as a stable, transparent or translucent micellar solution of oil, water, and a surfactant. The solution may optionally contain one or more electrolytes and one or more cosurfactants. These microemulsions may be water-external, oil-external, or may fall into that class of micellar structures in which there is no identifiable external phase. The microemulsions may be single-phase solutions which can take up additional quantities of oil or water without phase separation. The microemulsions may be immiscible with oil, water, or both. In this instance, the microemulsion would be immiscible with excess oil, water or both in contact and in equilibrium with the microemulsion.

The solubilization characteristics of the microemulsions of interest in this invention and the volumetric ratios which express these solubilization characteristics are functions of a number of variables. The variables of strongest effect and most specific interest are temperature, oil composition, composition of the aqueous phase including ionic substances dissolved in the aqueous phase, and the molecular structure of the surfactant and alcohol cosolvent included in the microemulsion. With all other variables held constant, changes of any one variable can affect and change the volumetric ratios and interfacial tensions between the microemulsion and oil and water.

Table I summarizes the influence of more important microemulsion parameters or variables on interfacial tensions and solubilization characteristics for a given amine surfactant. As can be seen from this Table each of the parameters has an effect on the volumetric ratio of oil to surfactant in the microemulsion ($V_o/V_s$), the volumetric ratio of water to surfactant in the microemulsion ($V_w/V_s$), the interfacial tension between the microemulsion and oil ($\gamma_{mo}$), and the interfacial tension between the microemulsion and water ($\gamma_{mw}$).

TABLE I

| Increase in a Variable of Interest | Resulting Trends | | | |
|---|---|---|---|---|
| | $\gamma_{mo}$ | $V_o/V_s$ | $\gamma_{mw}$ | $V_w/V_s$ |
| Salinity | − | + | + | − |
| Temperature | + | − | − | + |
| Carbon Number of Alkyl Chain (N) | − | + | + | − |
| Molecular Weight of Alcohol Cosolvent | − | + | + | − |
| Oil Aromaticity | − | + | + | − |
| $CaCl_2 \cdot 2H_2O/NaCl$ Ratio | − | + | + | − |

(−) indicates a decrease
(+) indicates an increase

As can be seen from Table I the volumetric ratios and interfacial tensions are functions of a number of variables. However, for purposes of clarity, one aspect of this invention — changing the chemical structure of the surfactant — will be given primary emphasis. Another variable, salinity, will also be discussed in some detail.

The microemulsion for use in a specific application is designed by first determining information concerning the oil-bearing formation from which oil is to be recovered. The oil from the formation is analyzed to determine its physical and chemical characteristics. Similarly, water from the formation is analyzed to determine the quantity and type of ionic substances present. The formation temperature is also determined by conventional means.

Microemulsions are then formulated on the basis of the information obtained from the subterranean formation. An oil from the formation or one having similar physical and chemical characteristics is used. Similarly, formation water or an aqueous medium having similar physical and chemical characteristics is also employed. As a matter of convenience in this initial screening, these fluids are used in substantially equal volumes.

A surfactant is added to the oil and water to form a microemulsion. The present invention is not limited to any particular surfactant or type of surfactant, and any of the surfactants conventionally employed in surfactant flooding or microemulsion flooding can be advantageously utilized in the microemulsions and method of the present invention. For example, the surfactants applicable in accordance with the present invention can be any of those which are described in the following nonlimiting list of U.S. Pat. Nos.: 3,254,714; 3,301,325; 3,330,344; 3,368,621; 3,455,386; 3,348,611; 3,455,385; 3,455,389; 3,443,635; 3,443,636; 3,406,754; 3,261,399; 3,297,985; 3,480,080; 3,478,823; 3,477,511; and 3,469,630.

The surfactants utilized in the microemulsions of the present invention can be anionic, nonionic, or cationic in character with the particularly applicable surfactants being petroleum and synthetic sulfonates as well as polyoxyalkylated organic materials and sulfates thereof. Anionic sulfonate surfactants can be illustrated by metal or ammonium salts of sulfonate surfactants, e.g., alkali metal or ammonium salts of sulfonated petroleum hydrocarbons such as alkylated naphthalene sulfonates, alkylated benzene sulfonates; or the sulfocarboxylate salts; and the like. Exemplary sulfonates are the alkali metal (Na, K, Li) or ammonium salts of petroleum sulfonates such as $C_{15-30}$ alkyl aryl sulfonates, alkylated benzene sulfonates, and the like. Materials of this type are sold commercially under various tradenames such as petroleum sulfonates sold by the Bray Chemical Company or the Bryton Chemical Company as Bryton Sulfonate, F, 430, 467, 500; or the Sonneborn Chemical Company as Petronates; or Mobil Oil Company as "Promor" sulfonates of the SS-6, SS-20 series; American Cyanamid's "Aerosol OT" which is Na Dioctyl sulfosuccinate; and the like. A suitable sulfonate mixture is a sodium salt of a petroleum sulfonate in the molecular weight range of 350–420 and a sodium salt of a petrolem sulfonate in the molecular weight range of 420–580, or a sodium salt of a mixture of petroleum sulfonates having an average molecular weight in the order of about 430–470, and mixtures of such sulfonates from the above low and high molecular weights, and other salts of such petroleum sulfonates.

Particularly applicable surfactants utilized in the method of the present invention are the synthetic sulfonates which can be generically described as $C_{6-18}$ orthoxylene or toluene sulfonates wherein the salt-forming cation is selected from alkali metals, ammonium, and amines such as $C_{1-4}$ mono-, di-, and tri- alkanol amines, an example being monoethanolamine. A particularly applicable surfactant showing excellent characteristics in the environment of the present invention is a monoethanolamine $C_{12}$ orthoxylene sulfonate, i.e., an orthoxylene sulfonate containing a carbon chain predominating in $C_{12}$.

Sulfated polyoxyalkylated organic material surfactants can be prepared by suitable means such as sulfating with chlorosulfonic acid, sulfur trioxide, sulfonic acid, oleum or sulfuric acid in a suitable solvent, a surface-active water soluble oxyalkylated organic material having from about 8 to about 20 carbon atoms. Preferred materials comprise ethoxylated alcoholic compounds such as oxyalkylated alkanols which can be represented by the formula $RO(C_2H_4O)_{2-10}$—H; where R is an alkyl radial of 10–15 carbon atoms, the alcohol used in the ethoxylation being a mixture of alcohols of 10–15 carbon atoms.

Sulfates of ethoxylated primary alcohols are commercially available from Shell Chemical Company under the tradename Neodol 23–3A having the formula $C_{12-13}O(CH_2CH_2O)_3SO_3$ $NH_4$ and Neodol 25–3S of the formula $C_{12-15}O(CH_2CH_2O)_3SO_3Na$.

Other anionic sulfated ethoxylated alcohols are available from Union Carbide under the tradename Tergitol S such as Tergitol Anionic 14–S–3A (ammonium salt) or 15–S–3.0 (sodium salt).

Particularly interesting surfactants for use in the practice of this invention are the monoethanolamine salts of an alkylated orthoxylene sulfonate where the alkylate contains between 6 and 20 carbon atoms. Table II illustrates the molecular distribution of alkyl side chains for three monoethanolamine orthoxylene sulfonates. These sulfonates are generally characterized as the monoethanolamine salts of nonyl, dodecyl, and pentadecyl orthoxylene sulfonate. However, as can be seen from Table II and the number of carbon atoms in the alkylate varies considerably.

TABLE II

Monoethanolamine Salts of Alkyl Orthoxylene Sulfonate
Alkyl Side Chain Molecular Weight Distributions

| Number of Carbon Atoms In Side Chain | Distribution, weight percent | | |
|---|---|---|---|
| | Nonyl | Dodecyl | Pentadecyl |
| 8 | 1 | | |
| 9 | 69 | | |
| 10 | 23 | 10.6 | |
| | | | 4.8 |
| 11 | 7 | 16.1 | |

TABLE II-continued
Monoethanolamine Salts of Alkyl Orthoxylene Sulfonate
Alkyl Side Chain Molecular Weight Distributions

| Number of Carbon Atoms In Side Chain | Distribution, weight percent | | |
|---|---|---|---|
| | Nonyl | Dodecyl | Pentadecyl |
| 12 | | 57.2 | 1.5 |
| 13 | | 9.6 | 2.6 |
| 14 | | 3.8 | 10.5 |
| 15 | | 2.7 | 56.5 |
| 16 | | | 17.7 |

The microemulsions of this invention may optionally contain additional electrolytes and one or more cosurfactants. Suitable electrolytes; in addition to the sodium chloride of the brine; include, for example, other alkali metal or ammonium salts of anions such as chlorides, sulfates, nitrates, carbonates, phosphates, or the like and mixtures thereof.

The microemulsions useful in the method of the present invention may additionally contain one or more cosurfactants or solubilizers such as can be employed in microemulsions for viscosity control and to adjust brine tolerance. Typical examples of such cosurfactant include alcohols, amides, amino compounds, esters, aldehydes and ketones containing 1 to about 20 or more carbon atoms with compounds containing from 3 to about 16 carbon atoms being preferred. In addition, the ethoxylated alcohols and phenols, sulfated and sulfonated ethoxylated alcohols and phenols, as well as synthetic sulfonates described with regard to applicable surfactants can be effectively employed as cosurfactants in accordance with the present invention. Typical alcohol cosurfactants include, for example, isopropanol, n- and isobutanol, t-butanol; and amyl alcohols such as n-amyl alcohol, t-amyl alcohol, 1- and 2- hexanol, 1- and 2- octanol, decyl alcohols; alkyl aryl alcohols such as p-nonylphenol; hydroxy compounds such as 2-butoxyethanol, etc. and alcoholic liquors such as fusel oil. Particularly applicable cosurfactants in the method of the present invention include the lower alcohols. The ethoxylated alcohols which are applicably employed as the cosurfactant in the method of the present invention are generally ethylene oxide adducts of $C_6$ to $C_{20}$ primary alcohols wherein the adduct contains from 1 to about 100 moles of ethylene oxide. Such ethoxylated alcohols are available commercially from Shell Chemical Company under the tradename "Neodol" or from Conoco under the name "Alfol" and others. For example, the Neodol identified as Neodol 23-6.5 is a mixture of $C_{12}$–$C_{13}$ alcohols having an average of 6.5 ethylene oxide groups. Conoco "Alfol" alcohols such as Alphonic 1012-6 or 1218-6 have the following structural formulas: $CH_3 — (CH_2)_x — O—(CH_2CH_2O)_nH$; where $x$ is an integer of from 8 to 16 and $n$ is an integer of 5 to 8. Alphonic 1012-6 is a $C_{10}$–$C_{12}$ primary alcohol containing six ethylene oxide units and Alphonic 1218-6 is a $C_{12}$–$C_{18}$ primary alcohol containing six ethylene oxide units. These ethylene oxide adducts of primary alcohols as well as related materials can be conveniently employed as the cosurfactant in the method of the present invention.

The sulfated polyethoxylated alcohol cosurfactant can be prepared from any of the above noted surfactants.

The ethoxylated phenols which can be effectively employed as the cosurfactant in accordance with the method of the present invention comprise ethylene oxide adducts of alkylated phenols such as octyl phenols, nonyl phenols, etc. The number of ethylene oxide groups varies from 1 to about 100 with up to 10 ethylene oxide groups being preferred. These adducts of ethylene oxide and alkyl phenols can be prepared by techniques which are well-known and the adducts are commercially available materials.

For example, ethylene oxide adducts of nonyl phenols having varying numbers of ethylene oxide units are available commercially under the "Triton-N" series from the Rohm and Haas Company, Philadelphia, Pa., and also under the name "Igepal" available from GAF Corporation, Dyestuff and Chemical Division, and also from Antara Chemicals. Also, ethylene oxide adducts of octyl phenols are available commercially under the "Triton X" series of Rohm and Haas.

The sulfated ethoxylated phenols can be prepared by techniques well-known in the art, the techniques being similar to the sulfation technique described previously with regard to the sulfated ethoxylated alcohols. Accordingly, any of the above noted ethoxylated phenols can be sulfated with the sulfated ethoxylated phenols being applicably employed as a cosurfactant in the method of the present invention.

The sulfonated ethoxylated phenols applicable in accordance with the present invention can be represented by the formula:

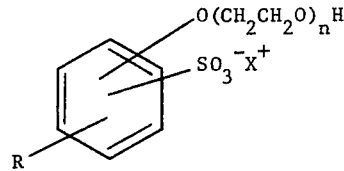

wherein R is a $C_{6-18}$ alkyl group, $n$ is an integer of 1–100, and X is a suitable cation. These materials can be prepared by alkylation of phenol, sulfonation of the alkylated phenol, and subsequent ethoxylation. Similarly, the sulfonated ethoxylated alcohols can be conveniently prepared by sulfonating any of the ethoxylated alcohols previously discussed.

The synthetic sulfonates which are applicable as cosurfactants in accordance with the present invention include a group of materials having a structural formula:

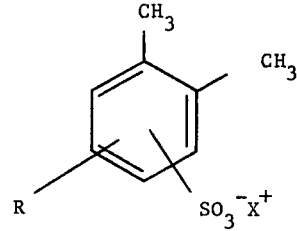

wherein X is a suitable cation and R is a $C_{1-7}$ alkyl group.

It should be readily apparent from the above that the discussed cosurfactants are merely exemplary of the variety of cosurfactants which can be employed to increase the brine tolerance and adjust the viscosity of one or more phases injected in accordance with the present invention. Accordingly, any cosurfactants capable of adjusting the brine tolerance, temperature tolerance, or viscosity of a microemulsion can be effectively utilized either singly or in combination of two or more in the method of the present invention and the present invention is not to be deemed as limited to those exemplified above.

In preparation for determing the volumetric ratios, microemulsions are first formed using the selected oil, the selected aqueous medium, and a selected surface-active agent. The surface-active agent is employed at a concentration which is sufficient to form a microemulsion, i.e., at a concentration in excess of the critical micelle concentration. The surfactant concentration is selected to be less than that required to make the overall composition a single phase microemulsion.

The oil and water in approximately equal concentrations are thoroughly mixed in 100 ml graduated cylinders and allowed to equilibrate at the temperature of interest, in this instance approximately reservoir temperature, until the initial emulsions have separated into distinct translucent phases having volumes that do not change with time. The time for a particular emulsion to completely disappear can vary from minutes to months.

The solubilization characteristics of the microemulsions are then determined. Since the volume of oil, water, and surfactant are known, the volumes of each of these components can be readily determined. It has been found that substantially all of the surfactant remains in the microemulsion and is not present to any significant degree in excess oil or water phases which are present. Thus, the volume of surfactant in the microemulsion phase is assumed to be the initial surfactant volume and the volume of oil and water in the microemulsion is the initial volume less any volume of oil or water which might be present as an excess phase.

Figure 2:
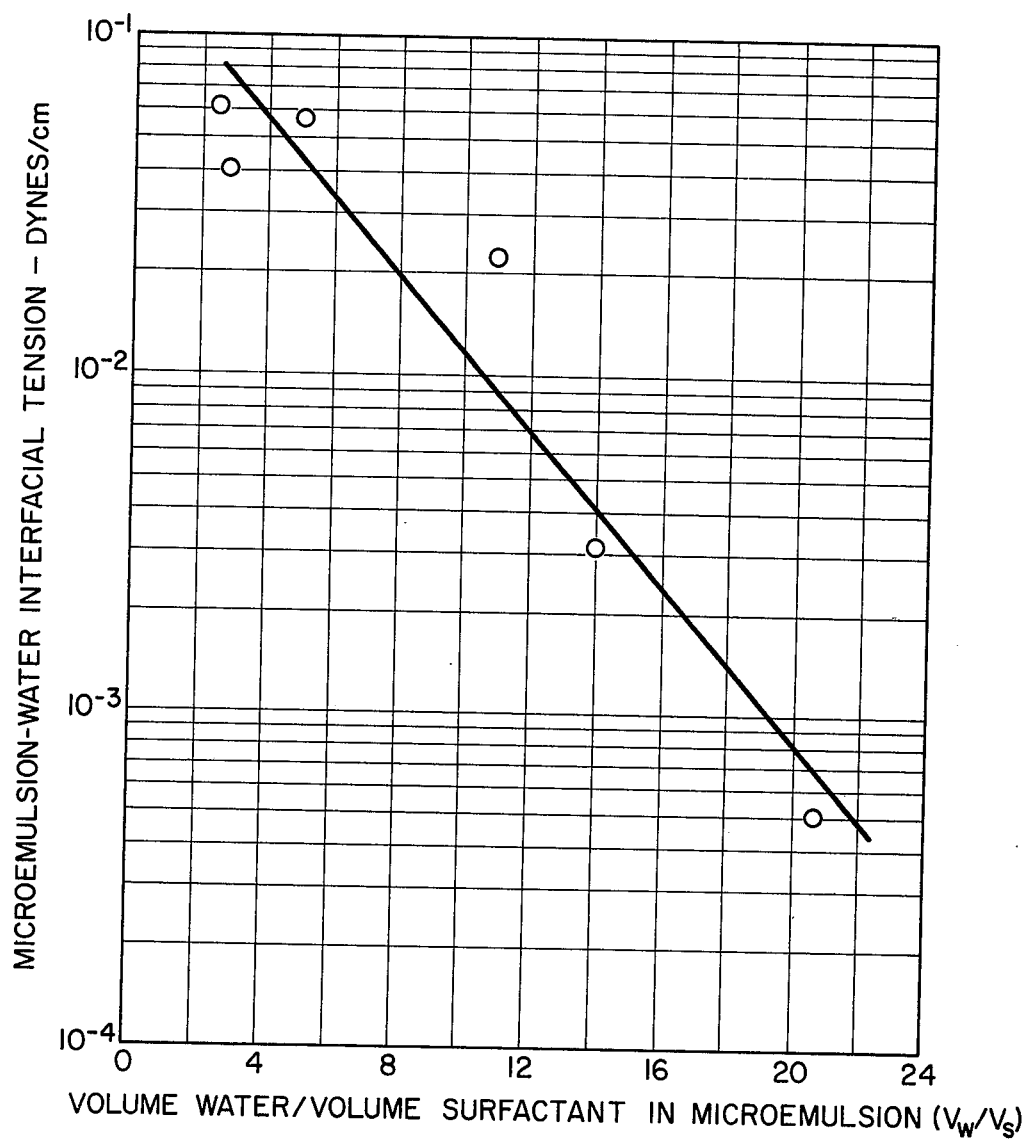
FIG. 2 is a semilogarithmic graph of the interfacial tension expressed in dyne/cm between a microemulsion and water which is immiscible and in equilibrium with the microemulsion as a function of the volumetric ratio of water to surfactant in the microemulsion.

The volumetric ratios so determined are indicative of interfacial tensions existing between the microemulsion and excess oil and water phases. Example I and related FIGS. 1 and 2 illustrate the correlations between interfacial tensions and the volumetric ratios.

EXAMPLE I

A number of microemulsion compositions were prepared by mixing equal volumes of water containing varying proportions of dissolved solids and an oil which was a mixture of Isopar-M and Heavy Aromatic Naphtha in a ratio of 9:1. Isopar-M and Heavy Aromatic Naphtha are tradenames of refined paraffinic and aromatic oils, respectively, sold by Exxon Chemical Company, U.S.A. This mixture of Isopar-M and Heavy Aromatic Naphtha approximates the physical and chemical characteristics of a particular formation crude oil. The salt content of the water volumes varied from 0.5 to 3 percent by weight sodium chloride. The surfactant added to the solution was a monoethanolamine salt of dodecyl orthoxylene sulfonate. The cosurfactant was tertiary amyl alcohol. The surfactant concentration was approximately 1.89% by volume; the cosurfactant volume was approximately 1.11%. These mixtures were agitated to permit thorough mixing and then permitted to stand for phase separation. The volume of oil and volume of water taken up by each microemulsion was measured, and the volumetric ratios of oil to surfactant and of water to surfactant were calculated.

Interfacial tensions at the interface between the microemulsion and excess liquid phases were measured using the sessile drop technique. The sessile drop technique employed in this Example is more fully described in "Physiochemical Aspects of Microemulsion Flooding," Healy, R. N. and Reed, R. L., *Society of Petroleum Engineering Journal*, Oct. 1974, Volume 14, pp. 491–501.

The results of the volumetric ratio determinations and the interfacial tension measurements are shown in FIGS. 1 and 2. As can be seen from these FIGURES, the interfacial tension between the microemulsion and oil bears an inverse relationship to the volumetric ratios of oil to surfactant contained in the microemulsion. Similarly, the interfacial tension between the microemulsions and excess water phases are inversely related to the volumetric ratios of water to surfactant contained in the microemulsions.

It should be noted that in this Example the volumetric ratios of the microemulsions were determined by varying the salinity of the aqueous phase in the microemulsion. However, as previously discussed, these ratios are functions of a number of variables and can be changed by varying any of these parameters.

Figure 3:
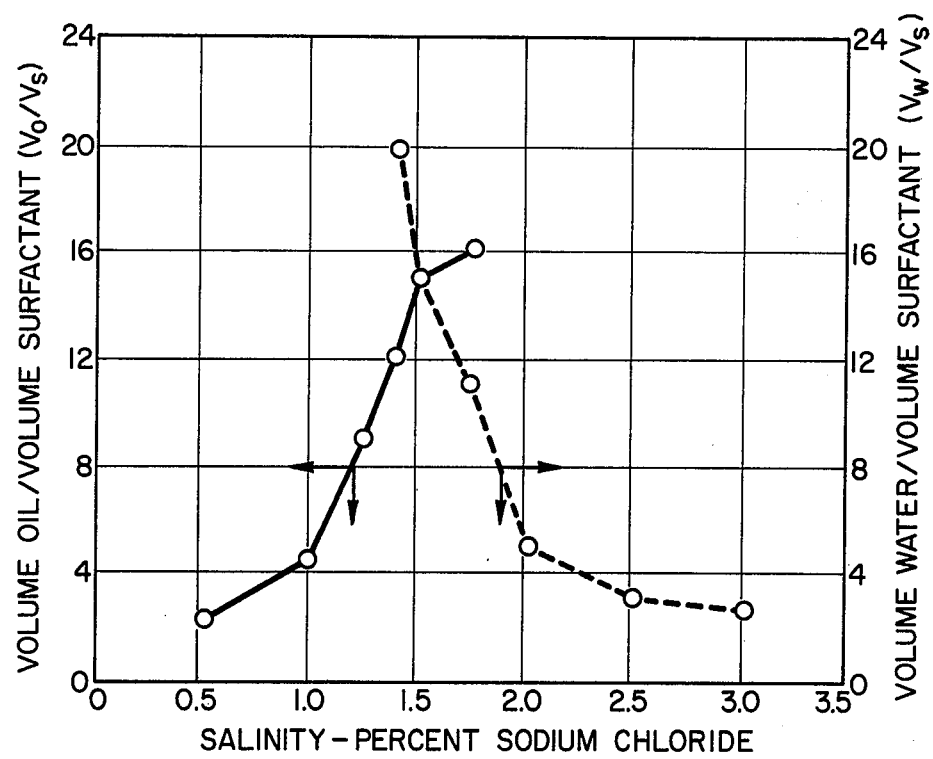
FIG. 3 is a graph of the volumetric ratio of oil to surfactant in the microemulsion and the volumetric ratio of aqueous medium to surfactant in the microemulsion expressed as a function of the weight percent of sodium chloride in the aqueous medium.

Example II and related FIG. 3 illustrate another aspect of this invention. This example shows that by varying one of the parameters of the microemulsion system, in this instance salinity of the aqueous phase, the volumetric ratios of the microemulsion system can be changed.

EXAMPLE II

Various microemulsion systems were prepared as described in Example I and permitted to equilibrate. After equilibration the volumetric ratios of oil to surfactant and water to surfactant within the microemulsion were determined. As can be seen from FIG. 3, these volumetric ratios are all greater than the value of 0.5 and therefore any microemulsion system prepared in this manner would be effective for oil recovery. However, the volumetric ratios are substantially equal at a salinity of 1.5 weight percent sodium chloride. It has been found that microemulsions wherein $V_o/V_s$ and $V_w/V_s$ both are equal and have a large value are particularly effective in recovering oil. This will be discussed more fully in Example III.

After a microemulsion system is developed as previously discussed having volumetric ratios of oil and/or water to surfactant in excess of 0.5 and preferably ratios which are equal, a microemulsion for injection into the oil-bearing formation can be prepared. An important aspect which has been found is that having determined the most effective microemulsion system for use in specific conditions, other microemulsions within this system can be effectively used to recover oil from the formation. Thus, using the example test conditions set forth above, the ratio of oil to water for the overall composition was approximately 1:1. However, in practical application and for economic considerations, the oil content of the injected microemulsion may be considerably less. For example, the microemulsion injected into the oil-bearing formation may contain only that quantity of oil which is necessary to form a microemulsion. For example, an injected microemulsion system may contain 3% monoethanolamine dodecyl orthoxylene sulfonate, 2% tertiary amyl alcohol, 3% formation crude oil, and the remainder formation water. If, using the techniques previously described, it has been determined that a microemulsion system containing equal parts oil and water, 3% orthoxylene sulfonate, and 2% tertiary amyl alcohol will give effective volumetric ratios, the low oil content microemulsion will also be effective in recovering oil from the formation.

Example III illustrates the effect of the volumetric ratios on oil recovery for a particular system.

EXAMPLE III

A series of microemulsions was formulated using 1.89% surfactant, 1.11% cosurfactant, 48.5% oil and 48.5% water. The surfactant was the monoethanolamine salt of $C_{12}$ orthoxylene sulfonate. The cosurfactant was tertiary amyl alcohol. The oil was Isopar-M/Heavy Aromatic Naphtha in a ratio of 9:1. The aqueous phase was water having a sodium chloride content ranging from 0.2 to 3 percent by weight.

Figure 4:
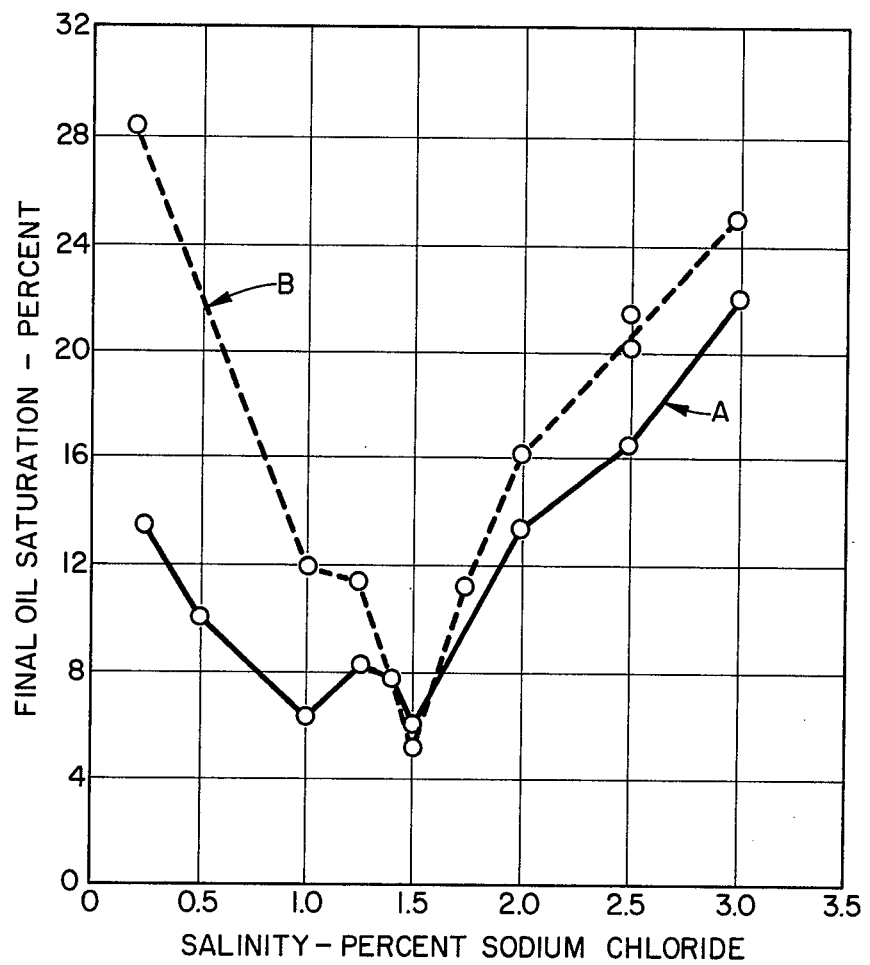
FIG. 4 is a graph of the results of core displacement tests using microemulsions corresponding to FIGS. 1–3. The oil recovery is shown as a function of the weight percent sodium chloride in the water contained in the microemulsions.

FIG. 4 (graph A) shows the result of core displacement tests using slugs of these microemulsions driven by thickened water having the same salinity as the water used to form the microemulsion.

The amount of residual oil remaining in the core after flooding is given as a function of the salinity of the water used to form the microemulsions. These core displacement tests were conducted in sections of Berea sandstone having dimensions of 1 × 1 inch and 48 inches long. These cores had an initial permeability to brine of approximately 350 millidarcies and were mounted in epoxy with tap fittings at each end for injection and production of fluids.

Prior to conducting the displacement tests the cores were flooded with oil and brine to approximate the oil and water saturations that would exist in an oil reservoir which had been flooded to the point that no further oil could be produced by waterflooding. In conducting these tests, the cores were first saturated with the brine solution having a salt content equivalent to that of the aqueous phase of the microemulsion which was to be injected into each of the cores. The cores were then flooded with a 9:1 mixture of Isopar-M/Heavy Aromatic Naphtha until no further brine could be produced. Next, the cores were flooded again with the various brine solutions to remove all of the oil which could be recovered by this conventional waterflooding process. At this point, the quantities of oil and water remaining in the core approximated those of a reservoir which had been waterflooded to residual oil saturation. The residual oil in each of these cores was approximately 30% of the pore volume of the core with the remaining 70% saturated with brine.

Comparison of FIG. 4 (graph A) to FIG. 3 clearly shows that oil recovery is related to $V_o/V_s$ and $V_w/V_s$. Also, FIG. 3 shows that at a salinity of 1.5% NaCl a system containing a monoethanolamine dodecyl orthoxylene sulfonate gave $V_o/V_s = V_w/V_s = 15$; and FIG. 4 (graph A) shows that the lowest final oil saturation was achieved at a salinity of 1.5% NaCl. Microemulsions having salinities greater or less than this level (where $V_o/V_s = V_w/V_s$) left more oil in the core.

EXAMPLE IV

A series of microemulsions was formulated using 1.89% surfactant, 1.11% cosurfactant, 90% water and 7% oil. Oil, surfactant, cosurfactant, and water were the same as in Example III. These microemulsions were used in core floods conducted in the same manner as in Example III. Oil recovery results (FIG. 4, graph B) for these microemulsions formed using a very high water-oil ratio (90:7) are essentially the same as for the microemulsions formed using a 1:1 water-oil ratio (FIG. 4, graph A). In fact, the minimum final oil saturation occurred at 1.5% NaCl in both cases. This suggests that if a microemulsion formed using a given overall composition of surfactant, water, and oil is effective for oil recovery, then any other different overall composition of the same surfactant, water, and oil should also form a microemulsion that is effective for oil recovery.

EXAMPLE V

In this example three microemulsions were tested in accordance with the practice of this invention to determine if they would be suitable for recovering oil under a given set of conditions. The temperature of the fluids was 74°F. Each microemulsion contained the same brine and oil, but the surfactant was varied. Each of three 100 ml samples containing equal volumes of the oil and the aqueous fluid were contacted with a different surfactant. The surfactants used in the test were monoethanolamine salts of nonyl orthoxylene sulfonic acid, dodecyl orthoxylene sulfonic acid, and pentadecyl orthoxylene sulfonic acid. These surfactants were added to the samples in an amount such that the overall surfactant concentration was 1.89% and the tertiary amyl alcohol cosurfactant concentration was 1.11%. The oil was a mixture of Isopar-M and Heavy Aromatic Naphtha (HAN) in a ratio of 9:1. The aqueous fluid was a brine solution containing 1% sodium chloride.

After the microemulsion had come to equilibrium with the immiscible phase or phases, the volumetric ratios of oil to surfactant and/or water to surfactant were determined. All the volumetric ratios were determined by material balance calculations.

The results of these volumetric measurements are illustrated below in Table III.

TABLE III

| Surfactant $C_n$ orthoxylene sulfonate | $V_o/V_s$ | $V_w/V_s$ |
|---|---|---|
| $C_9$ | 0.8 | * |
| $C_{12}$ | 4.5 | * |
| $C_{15}$ | ** | <1.0 |

*The microemulsion took up all of the water. Since the microemulsion-water interfacial tension was zero, the value of $V_w/V_s$ was not calculated.
**The microemulsion took up all of the oil. Since the micro-emulsion-oil interfacial tension was zero, the value of $V_o/V_s$ was not calculated.

As indicated in the Table, the microemulsions containing $C_9$ orthoxylene sulfonate and $C_{12}$ orthoxylene sulfonate took up all of the water, was immiscible with the oil and had a $V_o/V_s$ of 0.8 and 4.5, respectively. The microemulsion containing $C_{15}$ orthoxylene sulfonate took up all of the oil, was immiscible with the water and had a volumetric ratio $V_w/V_s$ of less than 1.0. Since the microemulsion containing $C_{12}$ orthoxylene sulfonate had the highest values of $V_o/V_s$ or $V_w/V_s$ this microemulsion is selected as the microemulsion most likely to have low interfacial tensions against both water and oil and to be effective for recovering oil from a formation having physical and chemical characteristics approximately the same as the physical and chemical characteristics of the oil and water used to form the microemulsion.

EXAMPLE VI

This sample was prepared in the same manner as Example V using the same composition oil, brine, and surfactant. This Example differs from the microemulsions prepared in Example V in that the brine solution used to form the microemulsion contained 4% by weight sodium chloride rather than 1% by weight sodium chloride. Table IV illustrates the results of these tests.

TABLE IV

| Surfactant $C_n$ orthoxylene sulfonate | $V_o/V_s$ | $V_w/V_s$ |
|---|---|---|
| $C_9$ | 2.8 | 2.5 |
| $C_{12}$ | * | 0.1 |
| $C_{15}$ | * | <1.0 |

*The microemulsion took up all of the oil. Since the microemulsion-oil interfacial tension was zero, the value of $V_o/V_s$ was not calculated.

As can be seen from the Table, the microemulsion containing $C_9$ orthoxylene sulfonate was immiscible with both the oil and water. The volumetric ratios $V_o/V_s$ and $V_w/V_s$ were determined to be 2.8 and 2.5, respectively. The microemulsions containing $C_{12}$ orthoxylene sulfonate and $C_{15}$ orthoxylene sulfonate both took up all of the oil phase, were immiscible with the water phase, and had a volumetric ratio $V_w/V_s$ less than 1.0.

In accordance with this invention, the microemulsion containing $C_9$ orthoxylene sulfonate would be the best to effectively recover oil from reservoirs having physical and chemical characteristics approximately the same as the oil and water used to form the microemulsion.

In accordance with the practice of this invention a microemulsion solution comprising water containing 4% sodium chloride, 9:1 Isopar-M/HAN, and $C_9$ orthoxylene sulfonate may be injected into the formation having a temperature of about 74°F and containing a brine with a 4% sodium chloride concentration to recover oil therefrom. The injected microemulsion should exhibit sufficiently low interfacial tension against oil and water to effectively recover oil.

Generally, the microemulsion slugs injected into the subterranean formation in accordance with the present invention are slugs of from about 0.02 to 2 PV, preferably 0.05 to 0.5 PV. For purposes of economics, it is preferred, in accordance with the present invention, to minimize the injection of the microemulsion slug and it is preferred to inject such microemulsion slug in an amount from about 0.02 to 0.2 PV.

Following injection of a microemulsion in accordance with the present invention, a bank of thickened water may be injected into the formation to drive the injected phase through the formation to one or more production wells in fluid communication with the injection well or wells thereby allowing recovery of the crude oil through the production wells. The thickened water may comprise either ordinary water containing one or more conventionally employed thickeners or a brine to which one or more conventionally employed thickeners have been added for the purposes of providing the desired thickening and mobility. Typical thickeners which have been previously utilized to provide a thickened water comprise water-soluble polymeric materials such as carboxymethyl cellulose, polyethylene oxide, high molecular weight salts of polymers containing amide and carboxylic groups produced by polymerizing acrylamide or its homolog such as methacrylamide and partially hydrolyzing the amide groups and the like. Particularly suitable thickeners comprise high molecular weight polyelectrolyte polymers such as partially hydroylzed polyacrylamides sold, for example, under such tradenames as "Pusher" from Dow Chemical Company. An additional class of polymers suitable as thickeners and mobility control agents are the bipolymers or polysaccharides such as "Kelzan XC" available from the Kelco Company. Also a new class of thickeners, sulfated polyoxyalkylated alcohols, as described in U.S. Pat. No. 3,888,308, Gale et al., can be effectively used. Any and all of these thickeners or various mixtures of them can, of course, be employed in the method of the present invention to provide a driving of the microemulsion slugs through the subterranean formation.

The principle of the invention and the best mode contemplated for applying that principle have been described. It is to be understood that the foregoing is illustrative only and that other means and techniques can be employed without departing from the true scope of the invention defined in the following claims.

What is claimed is:

1. A method of recovering oil from a subterranean formation containing formation oil and formation water which comprises:
   a. combining an oil having physical and chemical characteristics approximately the same as the formation oil, an aqueous medium having physical and chemical characteristics approximately the same as the formation water, and a surfactant to form a microemulsion and at least one liquid phase which is immiscible with said microemulsion;
   b. determining the ratio of the volume of said immiscible liquid phase in said microemulsion to the volume of the surfactant in said microemulsion;
   c. selecting a microemulsion having a volumetric ratio greater than 0.5; and
   d. injecting a microemulsion containing an oil, an aqueous medium and a surfactant each having physical and chemical characteristics substantially the same as the oil, aqueous medium, and surfactant contained in said selected microemulsion into said formation to recover oil.

2. A method as defined by claim 1 wherein said at least one liquid phase is said oil having physical and chemical characteristics approximately the same as the formation oil.

3. A method as defined by claim 1 wherein said at least one liquid phase is said aqueous medium having physical and chemical characteristics approximately the same as the formation water.

4. A method for recovering oil from a subterranean formation containing formation oil and formation water which comprises:
   a. combining an oil having physical and chemical characteristics approximately the same as the formation oil, an aqueous medium having physical and chemical characteristics approximately the same as the formation water, and a surfactant to form a microemulsion and two liquid phases which are immiscible with said microemulsion, one of said liquid phases being said oil and the other of said liquid phases being said aqueous medium;
   b. determining the ratio of the volume of said oil in said microemulsion to the volume of said surfactant in said microemulsion;
   c. determining the ratio of the volume of said aqueous medium in said microemulsion to the volume of said surfactant in said microemulsion;
   d. selecting a microemulsion having volumetric ratios greater than 0.5; and
   e. injecting a microemulsion containing an oil, an aqueous medium, and a surfactant each having physical and chemical characteristics substantially the same as the oil, aqueous medium, and surfactant contained in said selected microemulsion into said formation to recover oil.

5. A method for recovering oil from a subterranean formation containing formation oil and formation water which comprises:
   a. selecting an oil having physical and chemical characteristics substantially the same as the formation oil;
   b. selecting an aqueous medium having physical and chemical characteristics substantially the same as the formation water;
   c. selecting a surfactant;
   d. combining said selected oil, said selected aqueous medium, and said selected surfactant to form a microemulsion and at least one liquid phase which is immiscible with said microemulsion;
   e. determining the volumetric ratio of said immiscible liquid phase in said microemulsion to surfactant in said microemulsion;
   f. repeating steps (a)-(e) using surfactants having differing physical and chemical characteristics until a surfactant is selected which will form a microemulsion and at least one immiscible liquid phase and in which the volumetric ratio of immiscible phase in said microemulsion to surfactant in said microemulsion is greater than 0.5;
   g. preparing a microemulsion containing an oil, an aqueous medium and a surfactant each having physical and chemical characteristics substantially the same as the oil, aqueous medium, and surfactant contained in said microemulsion having a volumetric ratio greater than 0.5; and
   h. injecting said microemulsion prepared in step (g) into said formation to recover oil.

6. A method for recovering oil as defined by claim 5 wherein said immiscible liquid phase is said oil having physical and chemical characteristics approximately the same as the formation oil.

7. A method as defined by claim 5 wherein said immiscible liquid phase is said aqueous medium having physical and chemical characteristics approximately the same as the formation water.

8. A method as defined by claim 5 wherein said volumetric ratio is greater than 2.0.

9. A method as defined by claim 5 wherein said surfactant is an ethanolamine salt of an alkylated orthoxylene sulfonate.

10. A method as defined by claim 9 wherein said surfactant has an alkylate containing from 6 to 20 carbon atoms.

11. A method as defined by claim 5 wherein said microemulsion is injected into said formation and displaced by water containing a water thickener.

12. A method as defined by claim 11 wherein said water thickener is a polysaccharide.

13. A method as defined by claim 11 wherein said water thickener is a sulfated polyethoxylated alcohol.

14. A method as defined by claim 5 wherein said microemulsion is injected in a volume of from about 0.02 to 2 pore volumes of the portion of the subterranean formation to be swept.

15. A method as defined by claim 14 wherein said microemulsion is injected in a volume equal to about 0.05 to about 0.5 pore volumes of the portion of the subterranean formation to be swept.

16. A method for recovering oil from a subterranean formation containing formation oil and formation water which comprises:
   a. selecting an oil having physical and chemical characteristics substantially the same as the formation oil;
   b. selecting a saline aqueous medium;
   c. selecting a surfactant;
   d. combining said selected oil, said selected aqueous medium, and said selected surfactant to form a microemulsion and at least one liquid phase which is immiscible with said microemulsion;
   e. determining the ratio of the volume of said immiscible liquid phase in said microemulsion to the volume of the surfactant in said microemulsion;
   f. repeating steps (a)-(e) while varying the salinity of said aqueous medium until said selected oil, said selected aqueous medium and said selected surfactant form a microemulsion having a volumetric ratio of immiscible liquid phase in said microemulsion to surfactant in said microemulsion which is greater than 0.5;
   g. preparing a microemulsion comprising said selected oil, said selected surfactant, and saline aqueous medium capable of forming a microemulsion having a volumetric ratio greater than 0.5; and
   h. injecting said microemulsion prepared in step (g) into said formation to recover oil.

17. A method for recovering oil from a subterranean formation containing formation oil and formation water which comprises:
   a. selecting an oil having physical and chemical characteristics substantially the same as the formation oil;
   b. selecting an aqueous medium having physical and chemical characteristics substantially the same as the formation water;
   c. selecting a surfactant;
   d. combining said selected oil, said selected aqueous medium, and selected surfactant to form a microemulsion and two liquid phases which are immiscible with said microemulsion, one of said liquid phases being said oil and the other of said liquid phases being said aqueous medium;
   e. determining the volumetric ratio of said oil in said microemulsion to surfactant in said microemulsion,
   f. determining the volumetric ratio of said aqueous medium in said microemulsion to surfactant in said microemulsion;
   g. repeating steps (a)-(f) using surfactants having differing physical and chemical characteristics until a surfactant is selected which will form a microemulsion and two immiscible liquid phases and in which the volumetric ratios of the immiscible phases in said microemulsion to surfactant in said microemulsion are both greater than 0.5;
   h. preparing a microemulsion containing an oil, an aqueous medium, and a surfactant each having physical and chemical characteristics substantially the same as the oil, aqueous medium, and surfactant contained in said microemulsion having volumetric ratios greater than 0.5; and
   i. injecting said microemulsion prepared in step (h) into said formation to recover oil.

18. A method as defined by claim 17 wherein said volumetric ratios are each greater than 2.0.

19. A method as defined by claim 18 wherein said volumetric ratios are substantially equal.

* * * * *